United States Patent [19]
Hogan

[11] 3,953,298
[45] Apr. 27, 1976

[54] MOBILE REFINERY
[75] Inventor: Jim Smith Hogan, Houston, Tex.
[73] Assignee: Val Verde Corporation, Houston, Tex.
[22] Filed: May 6, 1974
[21] Appl. No.: 467,081

[52] U.S. Cl. ............................................... 196/133
[51] Int. Cl.² .......................................... B01D 1/00
[58] Field of Search ........... 196/115, 120, 133, 137, 196/155; 202/83

[56] References Cited
UNITED STATES PATENTS
| | | | |
|---|---|---|---|
| 718,209 | 1/1903 | Kirkaldy | 202/83 |
| 3,274,745 | 9/1966 | McManus et al. | 196/133 |

FOREIGN PATENTS OR APPLICATIONS
336,220   2/1936   Italy ..................................... 202/83

Primary Examiner—Jack Sofer
Attorney, Agent, or Firm—Murray Robinson; Ned L. Conley; David Alan Rose

[57] ABSTRACT

A portable skid mounted fully equipped topping plant for the distillation of gasoline and diesel fuel from crude oil feed, equipped with its own power supply, capable of producing its own electricity and power requirements, utilizing fuel processed from the crude feed, and designed for automatic operation and equipped with an automatic shut-down system.

9 Claims, 10 Drawing Figures

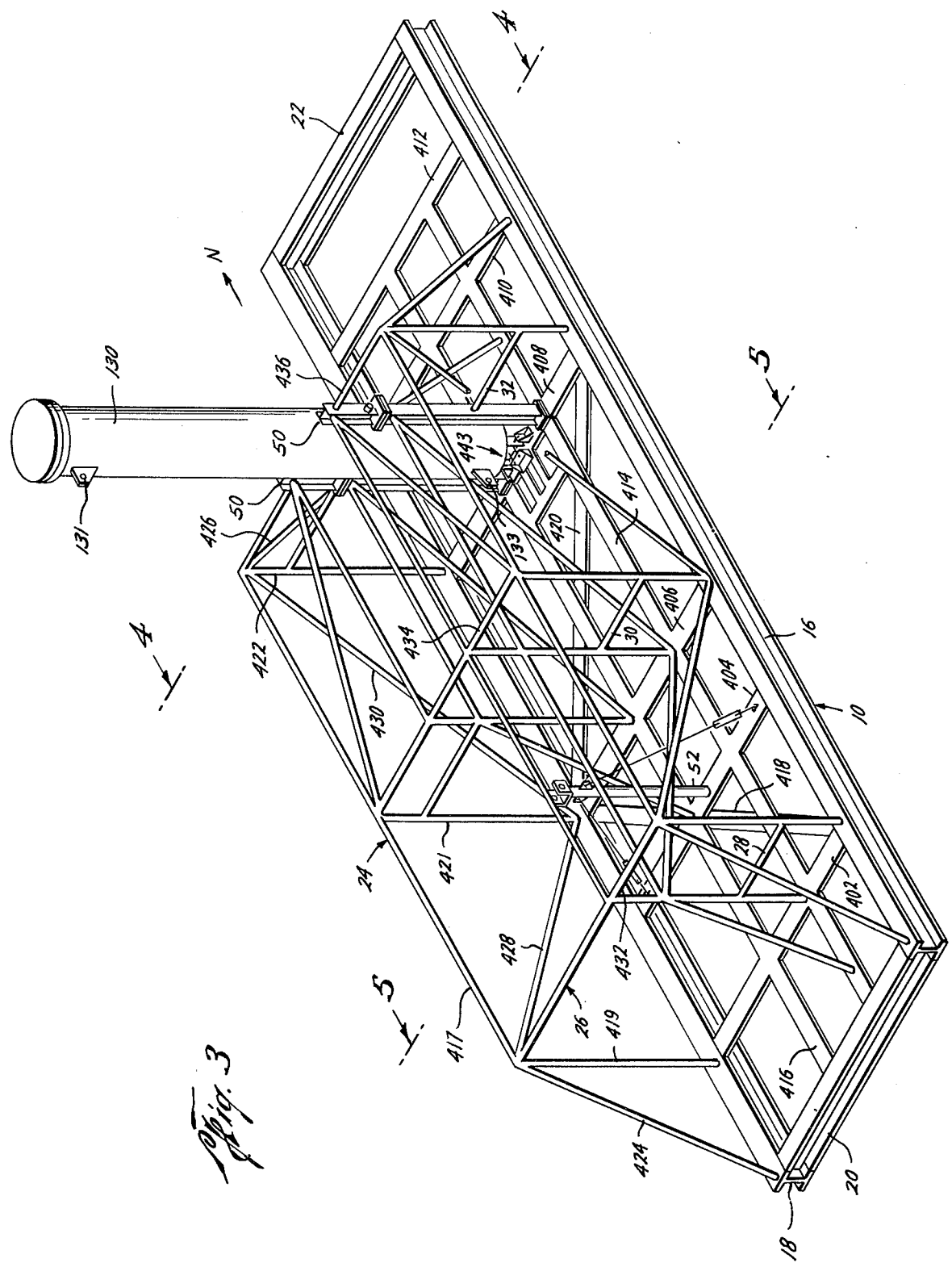

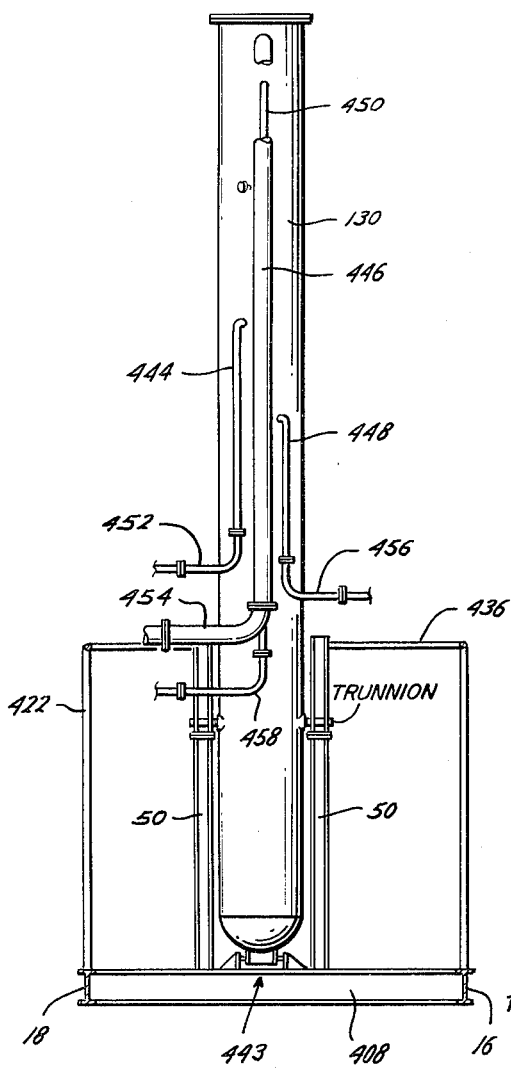
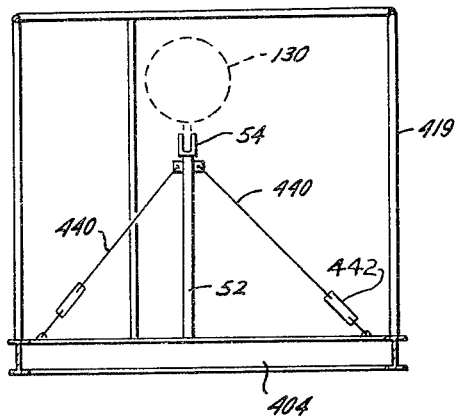
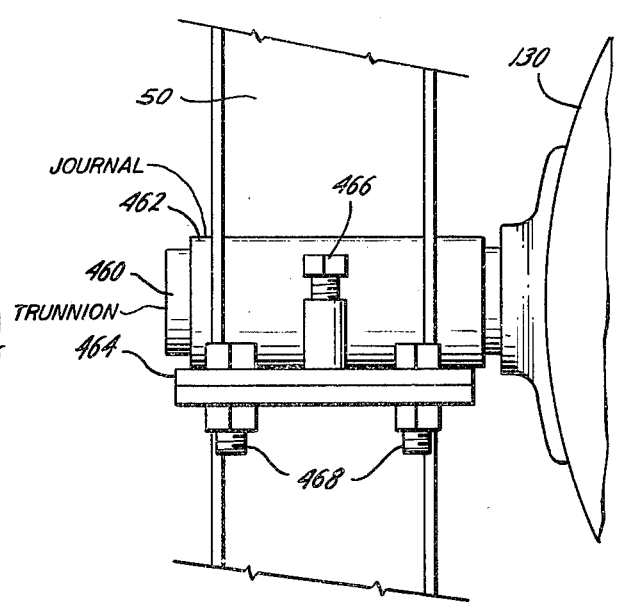

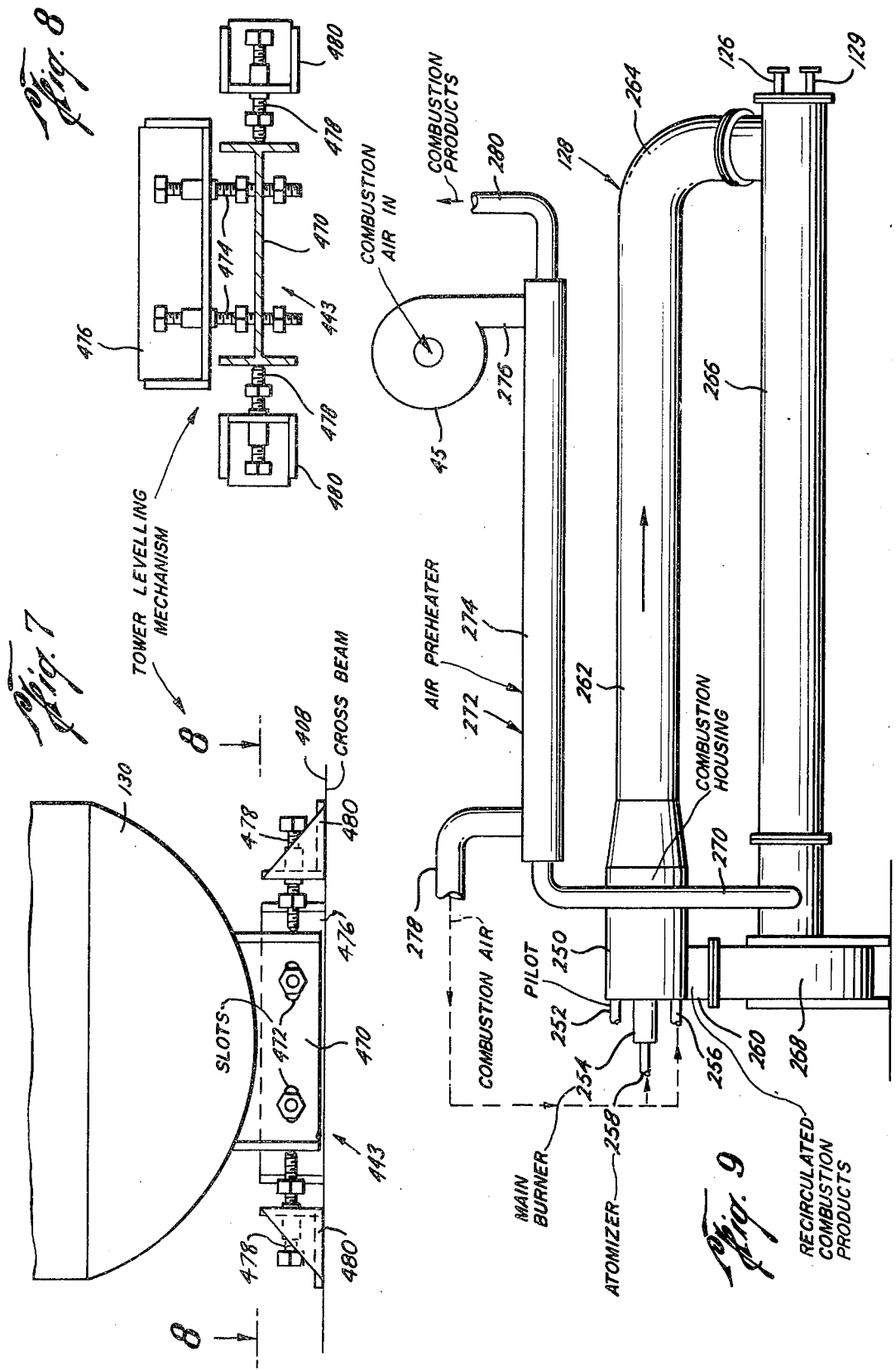

MOBILE REFINERY

BACKGROUND OF THE INVENTION

1. Field of the Invention

This invention relates to portable plants for the distillation of crude oil.

2. Description of the Prior Art

Crude oil distillation units, or topping plants, are well known in the art. Such plants provide means by which crude oil feed product is heated and distilled in a distillation tower, with several cuts being taken to produce products of various boiling ranges. All crude oil refineries utilize such units as a part of their refining process. Such a unit may produce, for example, diesel oil and heavy fuel oil in final product form, whereas other products, such as gasoline, must be further refined or treated to bring them to their most valuable commercial form.

Economically it has usually been considered to be most desirable to construct refineries near the market rather than near the source of production. Thus, refineries are usually constructed close to large marketing areas, and are made to handle extremely large volumes of crude oil, for example, 250,000 barrels per day and more, thereby refining the output of entire oil fields or a number of oil fields.

These economic facts produced the anomalous situation of crude oil producing areas having to import crude oil products from a substantial distance, sometimes even from a foreign country. Accordingly, consumers in many oil producing areas found themselves paying for transporation of their crude oil to a distant refinery, and again paying for transportation of crude oil products back to their area.

As a result of this problem, various efforts have been made to construct small crude oil refining units near producing areas. An example of such a plant is described in the Dec. 31, 1973 issue of the Oil & Gas Journal, at pages 146, 147. This article describes a distillation unit mounted on a number of skids so that it could be constructed at a distant plant and easily transported to the construction site. Certain of the elements of the plant are mounted on foundations whereas other portions of the plant are skidded. These plants are intended for permanent location at the construction site.

A more portable type plant is believed to have been constructed by the United States Navy in about 1955, this plant comprising a crude oil refinery constructed on three skids. It is understood that when this plant was first started it blew up. However, at a later date it is believed to have been reassembled and it may now be in operation. Details of the construction and operation of this plant are not known.

Until the present invention, no truly portable topping plant was available. Because of the characteristics of the equipment necessary for the topping plant, it was always necessary to spread out the equipment in such a way that it could not be built compactly enough for transport over the highways, for example. Thus, it has been impossible to provide portable topping units for use at sources of small amounts of crude oil, or for use in other places where the production of crude oil products in relatively small quantities is desirable.

A major problem to overcome in the construction of such a compact unit is that of providing sufficient heat in an economical manner to raise the crude oil to the temperatures necessary for distillation. Conventional salt bath, steam, and other heaters which have heretofore been used were undesirable because of their weight, cost, and other factors. A direct fired heater could not be used because such heaters unavoidably get hot spots which cause the tubes to burn through, causing the oil being processed to be set on fire, thereby endangering the entire plant.

Another problem in such a compact plant is the necessity for a distillation tower of substantial height, e.g. 25 feet or more. Height limitations preclude the transporting on the highways of a plant which includes such a distillation tower in operating position.

Another problem encountered in seeking to operate such a portable plant is that of providing adequate power to operate all functions of the plant under all conditions of operation.

Still another problem encountered is that the crude oil feed stock to the plant cannot be relied upon to be the same at all times, since it may be necessary for the plant to handle crude stocks of a wide variety of gravities. Since no degree of uniformity can be depended upon, many problems can be anticipated in operation of such a plant with a wide variety of feed stocks.

One of the major problems encountered in seeking to construct a topping plant which can be mounted on a single skid for transport on the highways is that of providing a skid which has sufficient strength to carry the weight involved without requiring a vertical height so great as to surpass highway height limitations.

SUMMARY OF THE INVENTION

According to a preferred embodiment of this invention, there is provided a portable skid mounted fully equipped topping plant capable of being mounted on a single skid and being transported on the highways. Such a plant can be constructed for a throughput capacity of 750 to 1,500 barrels per day or more, providing a finished product of straight run gasoline, diesel oil and heavy fuel oil residue.

In another aspect the invention provides a novel skid capable of supporting the weight of a complete topping plant within highway vertical height limitations. In a preferred embodiment the skid comprises a truss construction, and elements of the topping plant are constructed between and within the trusses.

In another embodiment of the invention a compact fully self-contained topping plant is provided which is capable of producing distillation products from a wide variety of crude oil feed stocks.

It is an object of the invention to provide such a crude oil topping plant which includes a crude oil heater which heats by convection, and requires a maximum heater temperature of about 900° F. The use of such a heater avoids the previous problems of excess weight, cost, and hot spots from radiant heating.

Another object of the invention is to provide a portable single skid mounted fully equipped topping plant including a fractionation tower which can be pivoted from a horizontal transport position to a vertical operating position.

Still another object of the invention is to provide a topping plant which includes a power unit capable of providing sufficient power for operation of the plant under a wide variety of conditions.

Other objects and disadvantages of the invention will become more apparent upon a consideration of the preferred embodiments described hereinafter.

BRIEF DESCRIPTION OF THE DRAWINGS

For a detailed description of a preferred embodiment the invention, reference will now be made to the companying drawings wherein:

FIG. 3 is an isometric view of a skid according to one nbodiment of this invention, showing a portion of the ¡uipment carried on the skid;

FIG. 4 is a vertical sectional view of the embodient of FIG. 3, taken at line 4—4 of FIG. 3;

FIG. 5 is a vertical sectional view of the embodiment ¨ FIG. 3, taken at line 5—5 of FIG. 3;

FIG. 6 is an enlarged detail of a portion of the embodiment of FIG. 3;

FIG. 7 is an enlarged detail of another portion of the nbodiment of FIG. 3;

FIG. 8 is a horizontal sectional view of the apparatus ıown in FIG. 7, taken at line 8—8 of FIG. 7;

FIG. 9 is an elevational view of a heater in accorance with one embodiment of this invention.

DESCRIPTION OF THE PREFERRED EMBODIMENTS

General

Figure 1:
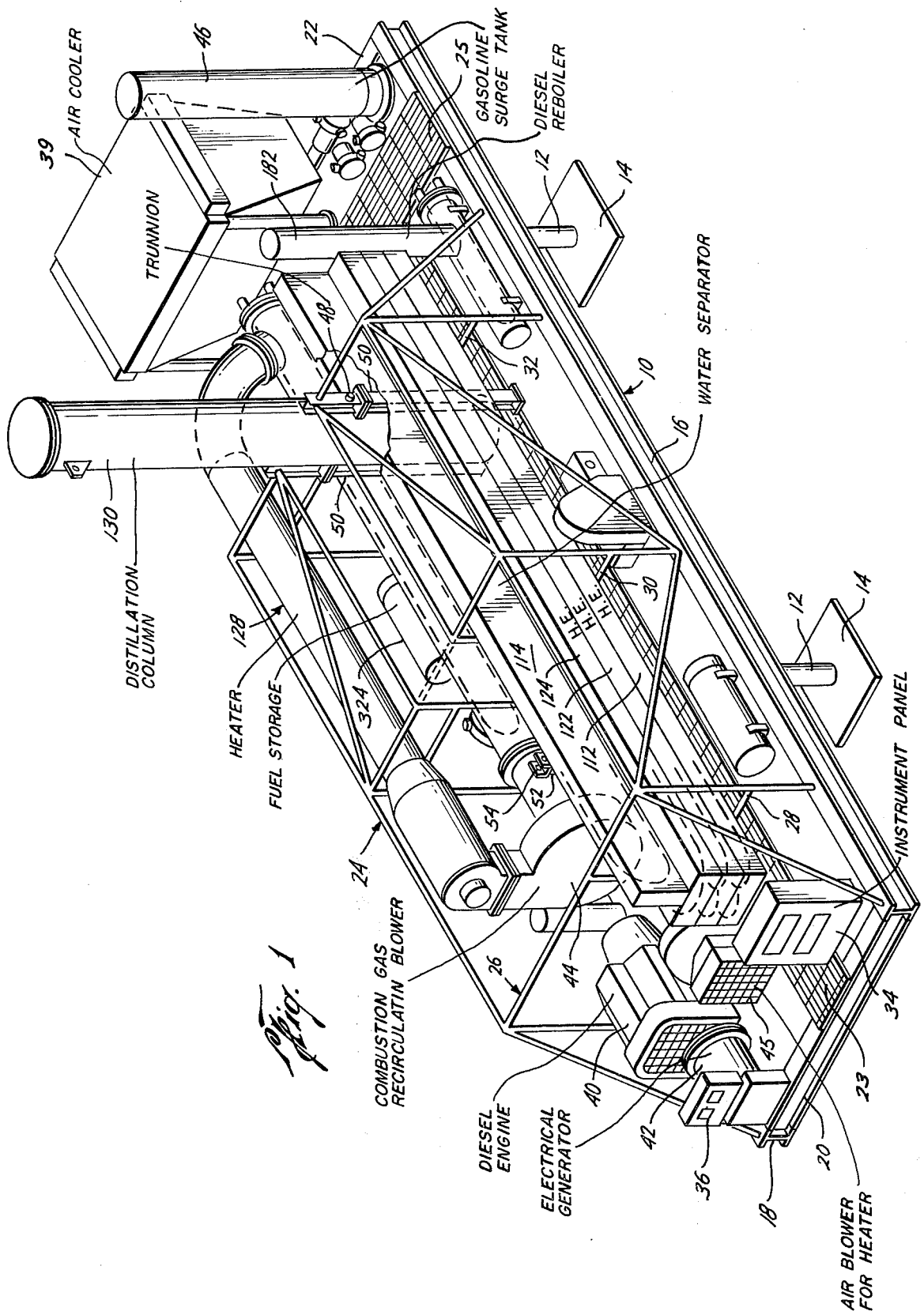
FIG. 1 is a perspective view, partially schematic, ustrating a preferred embodiment of the topping ant of this invention.

FIG. 1 of the drawing shows one embodiment of the ortable topping plant of this invention shown mounted n a single skid 10 which is supported upon a plurality ·f jack stands 12 comprising flat bottom plates 14 for ngagement with the ground. The skid 10 comprises a ¡lurality of parallel elongate beams, two of which are een at 16 and 18, and cross connecting beams such as hose shown at 20 and 22. In addition, bridge trusses ıdicated generally at 24 are erected on the elongate ıeams, being connected together by cross members, ¨ ıne of which is indicated generally at 26. Iron grating ırovides walkways 23 and 25 on the skid. A more deailed description of the skid construction will be proided later.

All of the equipment required for distillation of crude ıil is, in the preferred embodiment, mounted on this kid. In this preferred embodiment of the invention the kid may be of a size for mounting on a conventional ow boy truck trailer, the skid having dimensions of, for ¡xample, 12 feet wide, 45 feet long, and a maximum of .1 feet high.

The arrangement of apparatus shown on the drawing s one which has been found to be satisfactory, providng for each piece of equipment which is required ar· anged in such a manner that the equipment is accessi·le for operation and maintenance.

Supported on cross members 28, 30 and 32 is a group ıf three heat exchangers 112, 122 and 124 and a water ıeparator 114. Instrument panels 34 and 36 are desirıbly located at one end of the unit, and an air cooler 39 s mounted at the opposite end. A gasoline surge tank ł6 is mounted adjacent the air cooler. Adjacent one ≀nd of the heat exchangers is a diesel reboiler 182. Near the center of the skid is the distillation tower 130. Γhe heater 128 for heating the crude oil before feeding it into the distillation tower lies along the opposite side of the skid, and a fuel storage tank 324 is mounted adjacent the heater. A diesel engine 40 driving an electrical generator 42 is positioned at one end of the heater, the diesel engine also being adjacent the blower 44 which is driven by the engine. A blower 45 for supplying combustion air to the heater is also driven by the engine.

In FIG. 1 the tower 130 is shown in vertical operating position, being supported on trunnions 48 mounted in bearings supported on posts 50, which in turn rest on longitudinal skid beams 414 and 416 (see FIG. 3). During transport from one location to another, however, the tower is in horizontal position. In that position, the upper end of the tower rests on a post 52, being secured in position by a bolt through the clevis 54.

The foregoing constitutes the major portion of large equipment units required for the topping plant. In the drawing, valves, piping, instruments and other devices which form a part of the topping plant are not shown, since the particular form and location of such devices is within the skill of the art and forms no part of the present invention. To the extent that an explanation of these elements is necessary for a full understanding of the present invention, such explanation will be given in connection with the discussion of the flow diagram shown in FIG. 2.

Process

Although the basic process performed by the apparatus of this invention is well known to those skilled in the art and forms no part of the present invention, certain aspects form novel relationships which result in the ability to adapt to a wide variety of feed stocks and operating conditions, so that a description of the overall process is desirable.

Figure 2:
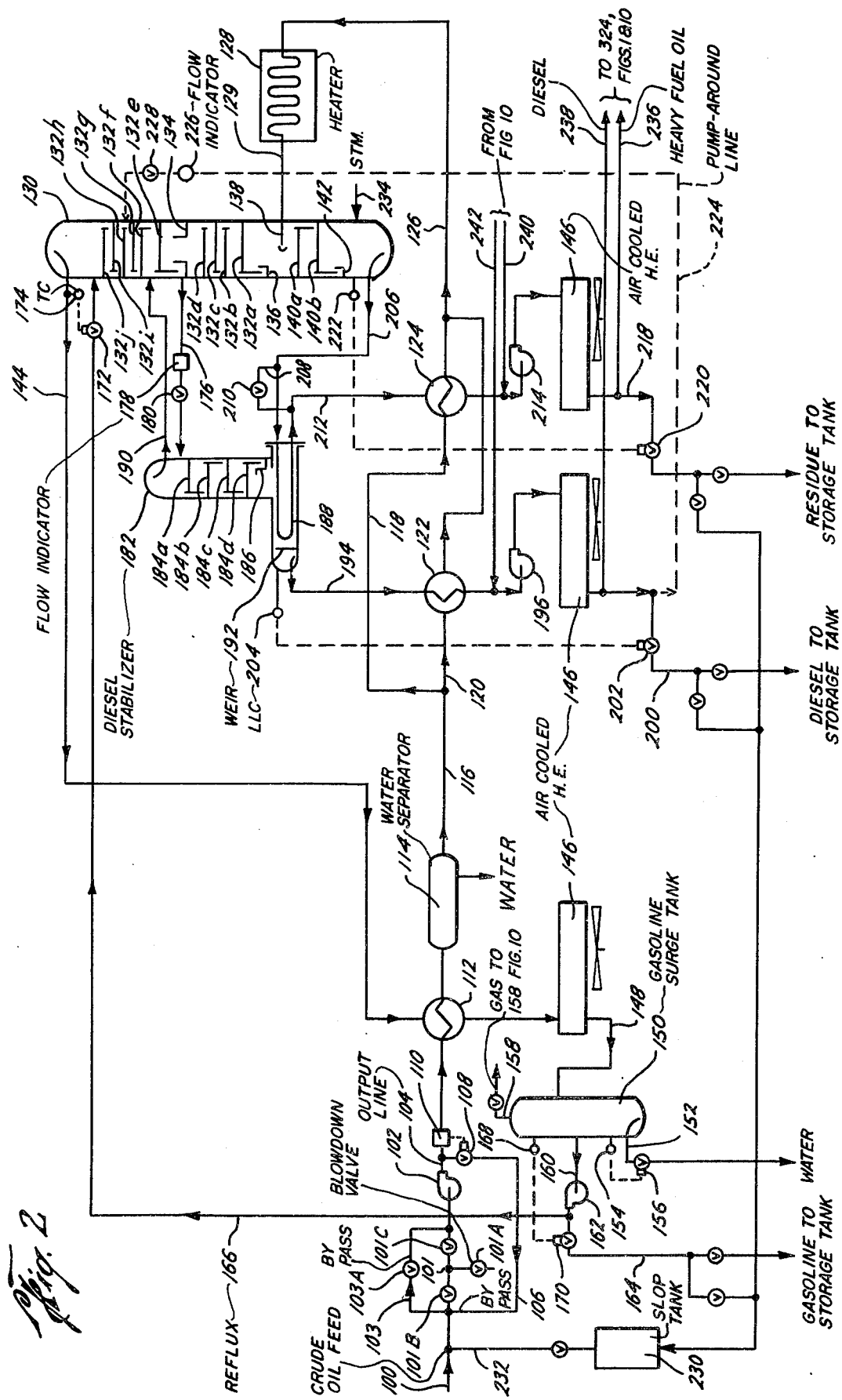
FIG. 2 is a schematic flow diagram of a preferred nbodiment of the topping plant of this invention.

Referring now to FIG. 2, the crude oil feed is supplied through a line 100 to the suction of a feed pump 102. The feed pump is preferably a reciprocating pump, as for example a Gaso triplex pump. A reciprocating pump is preferred because of its high efficiency and its ability to handle viscous materials at a substantially uniform flow rate. The output line 104 of the pump is provided with a bypass line 106 back to the suction of the pump. The bypass line has a flow control valve 108 which is controlled by a flow controller 110 in the line 104.

Intermediate the connection of the bypass 106 with line 100 and the pump 102, a strainer 101 is provided, with a blowdown valve 101A for removing collected trash. Valves 101B and 101C are provided to isolate the strainer, and a bypass line 103 contains a valve 103A which may be opened to bypass the strainer when the valves 101B and 101C are closed.

The oil, at atmospheric temperature, for example about 70° F., is pumped through a conventional heat exchanger 112 from which it emerges at a substantially higher temperature, for example 280° F. The heated oil is then fed to a conventional water separator 114 where water is separated out. It is preferable that the water separator follow the heat exchanger 112, since water is more easily separated from hot oil then from cold oil. The water separated out may include water which was produced with the oil, as well as any water which may have been added for the purpose of washing salt from the oil. Thus the water separator may also serve to remove salt from the oil.

Oil from the water separator flows through a line 116 which divides into two lines 118 and 120. Line 120 passes a portion of the oil through a heat exchanger 122 while line 118 passes the remainder of the oil through a heat exchanger 124. In these heat exchangers the crude oil is further heated to, for example, about 445° F. At this temperature and at the pressure existing in the combined output line 126 the crude oil may comprise, for example, about 10% vapor and the remainder liquid. This mixture is fed to a heater 128 where it is heated to a desired temperature for fractionation, for example about 650° F., at which temperature the mixture may comprise from 60 to 65% vapor. Clearly other temperatures may be used as necessary to obtain desired products, for example from a minimum of about 600° F. up to a maximum of about 730° F. Above this temperature range cracking is more likely to occur, and coke may be formed in the heater tubing and the fractionating tower. At lower temperatures more of the feed stock remains in the heaviest fractions.

The heated feed stock is fed through a line 129 to the fractionating tower 130 which may be built according to any one of a number of well known designs. However, the preferred embodiment, as shown in the drawing, consists of a plurality of fractionating trays 132A to 132J inclusive and basins 134 and 136 positioned above the inlet 138 for the feed stock. In the most preferred embodiment a pair of trays 140A and 140B together with a basin 142 may be positioned below the inlet 138, for a purpose which will hereinafter be explained.

In the tower shown the feed material is sprayed in and the liquid portion flows downwardly over the trays 140A and 140B to the lower end of the tower while the vaporous portion moves upwardly, passing through the fractionating trays 132A to 132J counter current to the downward flow of a liquid reflux on the fractionating trays. As the vapor moves upwardly it is cooled and partially condensed until at the level of tray 132E the temperature is, for example, from about 490° to 500° F. As the remaining vapor continues to move upwardly through the remaining trays the temperature is reduced further and more vapor is condensed until at the upper end of the tower the temperature of the remaining vapor may be, for example, about 320° F., and may be at a pressure of, for example, about six pounds per square inch gage. The temperature at this level determines the proportion of gasoline produced and the end point of that gasoline. This remaining vapor, consisting primarily of gasoline, is removed through a line 144 and passes through the heat exchanger 112, where it is used for the initial heating of the feed crude oil, the gasoline thereby being cooled. The temperature of the gasoline is reduced further by passing it through one of the tube bundles 146 carried within the air cooler 39, and the further cooled gasoline is fed through a conduit 148 to a gasoline surge tank 150. The surge tank, which may be of conventional construction, is essentially a gravity settling tank in which any water remaining in the gasoline settles to the bottom of the tank, from which it may be drained by way of a line 152. The level controller 154 controls a valve 156 to maintain a water level above the connection of line 152.

Any lighter fraction gases which come off the top of the gasoline are removed through the line 158 for use as fuel for the heater 128, as will hereinafter be explained.

Gasoline is taken from the gasoline surge tank through a line 160 by means of a pump 162. This pump pumps the gasoline to storage by a line 164, and at the same time provides reflux material for the tower 130 through a line 166. A level controller 168 on the gasoline surge tank 150 controls the valve 170 in the line 164, so as to maintain the level of gasoline in the surge tank. The amount of reflux gasoline to the tower is controlled by a valve 172 which is operated in response to a temperature controller 174 connected to the line 144 adjacent its point of connection to the tower. Thus if the temperature at the top of the tower becomes too high, the temperature controller opens the valve 172 to allow a greater flow of reflux gasoline.

The reflux material flows downwardly over the trays in the tower, serving to cool and condense upwardly moving vapor. Liquid material which flows downwardly into the basin 134 is taken off through the line 176. The amount of flow through this line, as indicated by a conventional flow indicator 178, may be controlled by a manually operated valve 180. This liquid cut, in the diesel fuel range, is fed to a diesel stabilizer 182. In the preferred embodiment of the invention the diesel stabilizer is a kettle type reboiler, although other forms of diesel stabilizers well known in the art may also be used. The diesel stabilizer is used to strip out light materials so as to increase the flash point of the diesel fuel as required to meet ASTM specifications and for safety purposes.

In the diesel stabilizer the diesel fuel flows downwardly over fractionating trays 184a to 184d into a basin 186 and thence into the lower end of the reboiler, where the remaining liquid is contacted by a conventional dual tube heat exchanger 188. The heat exchanger heats up the liquid to drive off the lighter fraction. The lighter fraction moves up through the bubble trays and is taken off through the line 190. The remaining liquid flows over a weir 192 into an outlet pipe 194, through which it is carried to heat exchanger 122. In this heat exchanger it serves to preheat the feed stock, while itself being cooled down to, for example 300° F. At this point, a pump 196 is provided to carry the diesel fuel through the air cooler 146 which lowers the temperature further down to, for example, about 150° F. At this temperature the diesel is carried to storage through a line 200. The flow rate through line 200 is controlled by a valve 202, which in turn is controlled from a level controller 204 on the diesel stabilizer.

The vapors which pass upwardly through the trays 184a to 184d in the diesel stabilizer are fed back to the tower through a line 190, at a temperature of, for example, 490° F. These may comprise, for example, about 10% of the amount of liquid fed to the diesel stabilizer through the line 176. This reflux material is inserted above tray 132e, and moves upwardly with the other vaporized material in the tower.

The temperature at various levels in the tower is controlled in part by the amount of diesel oil taken off through the line 176. Thus if too much diesel is taken off the temperatures will rise, thereby changing the specifications of the products. Typically, the amount of diesel oil taken off is controlled so that it maintains a temperature of about 500° F.

The heavier fraction which falls to the bottom of the tower is taken off through a line 206 and passes through the U-tube heat exchanger 188 in the bottom of the diesel stabilizer. This fraction may be at a temperature of, for example, 630° F., sufficient to heat the diesel oil as necessary to drive off light fractions. The bypass line 208, having a manually controlled valve 210, therein is used to control the amount of flow through this heat exchanger.

After passing from the diesel stabilizer through line 212 the residue is cooled in heat exchanger 124 and is then pumped, as by means of a pump 214, through air cooler 146. From the air cooler the heavy fuel oil product is conveyed through an insulated line 218 to a storage tank. Preferably the heavy fuel oil is maintained by a fairly high temperature in order to reduce its viscosity so that it flows more easily.

The rate of flow through the line 218 is controlled by valve 220 which is in turn controlled by a level controller 222 which maintains a suitable level in the bottom of the tower.

In some installations where it is desired to make a comparatively light side draw product, as for example for jet fuel, a pump-around line 224 may be provided to take the cooled product and use it as a reflux in the tower inserting it onto, for example tray 132f. A flow indicator 226 and a manually controlled valve 228 are used to determine the rate of flow through the line 224.

When the plant is first started, and possibly at other times, the plant will produce product which does not meet specifications and which, therefore, cannot be put in the regular product storage tanks. Such product is therefore put into a "slop" tank 230, suitable piping and valves being provided for this purpose. The combined products in the slop tank can then be combined with the feed stock, as desired, through a line 232.

In some instances it is desirable to provide steam stripping in the tower in order to obtain a better stripping out of lighter fractions. For this purpose a connection 234 is provided at the lower end of the tower to admit steam to the tower. Such operations are well known in the art and need not be described in further detail here.

Although the primary fuel for the heater 128 will comprise the gas taken off the top of the gasoline surge tank, in many cases there will be insufficient gas produced to take care of the heat requirements. Thus, means are provided to utilize diesel oil and heavy fuel oil for this purpose. Thus lines 236 and 238 connect to the heavy fuel oil line 218 and diesel oil line 200 respectively to conduct these materials as necessary to a heater fuel supply container (FIG. 10), and lines 240 and 242 return any excess of these liquids to the suctions of pumps 214 and 196 respectively.

Crude Oil Heating

The preferred embodiment of the heater 128 is shown in more detail in FIG. 9 of the drawing. As there shown, the heater comprises a combustion housing 250 fitted at one end with a pilot burner 252, a main burner 254 and a combustion air inlet 256. The main burner 254 is provided with a liquid fuel atomizer 258. The combustion housing also has an inlet opening 260 through which recirculated combustion products are received, and a heated gas outlet pipe 262. The elongate pipe 262 has at its other end an elbow 264 which connects into one end of a heat exchanger housing 266. The heat exchanger housing 266 contains a U-tube having inlet and outlet pipes 126 and 129 respectively, the U-tube (not shown) extending substantially the full length of the heat exchanger housing 266. At the other end of the heat exchanger housing a blower 268 takes suction from this housing and discharges into the inlet 260 to the combustion housing 250, thereby providing recirculation of a major proportion of the combustion products, which become admixed with the newly formed combustion products.

A portion of the combustion product is taken off the heat exchanger housing by means of a pipe 270 which leads into one end of a combustion air preheater 272, comprising a housing 274 and an inner heat exchanger tube supplied with air through a pipe 276 by the combustion air blower 45, and which discharges heated combustion air through a pipe 278. The exhaust combustion gases from the preheater 272 are released through a stack 280. These gases constitute the only gaseous emisssion from the plant of this invention, unless the gaseous product of the process is greater than that required for operation of the heater. In that event the excess gas can, of course, be stored or used in another manner.

Figure 10:
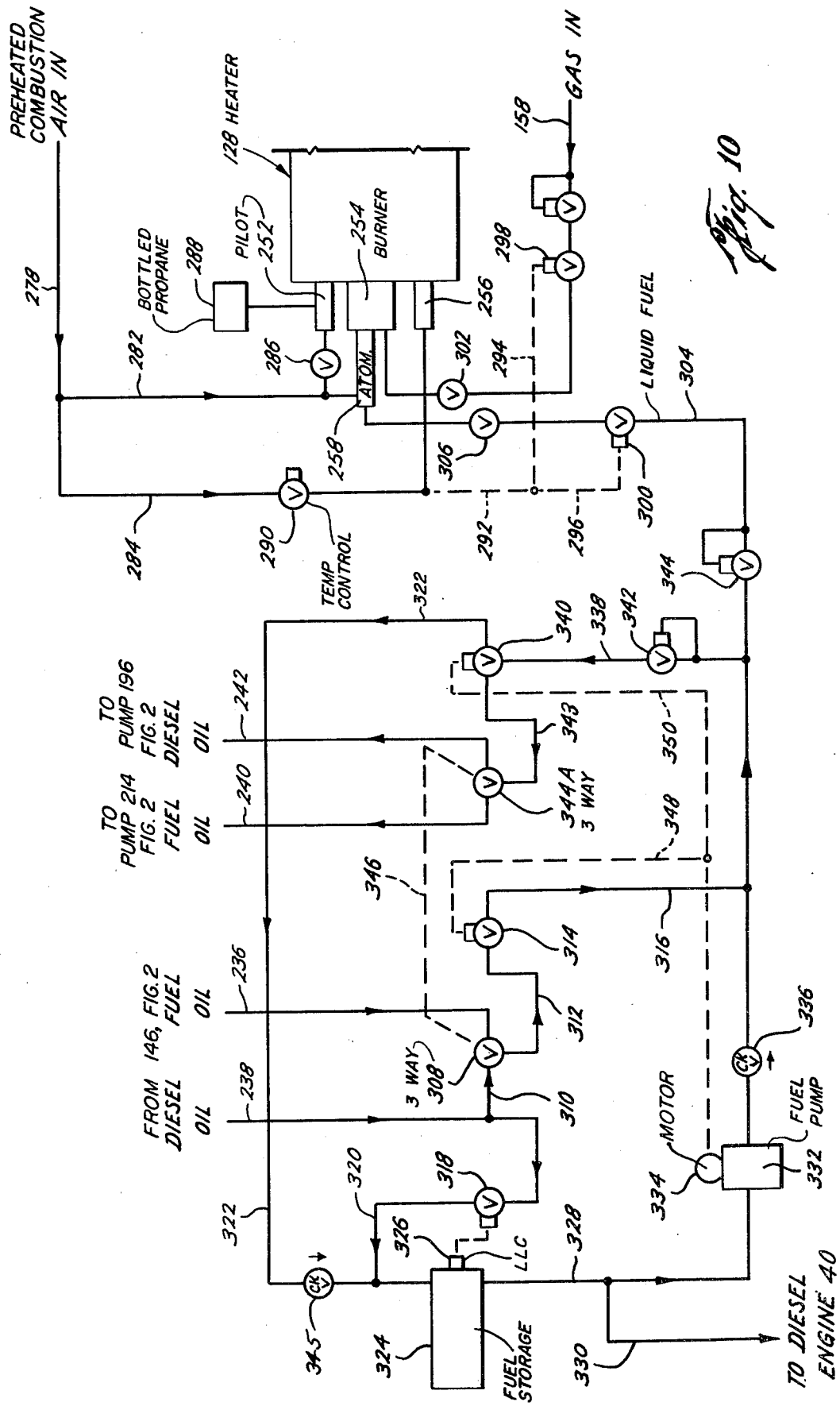
FIG. 10 is a flow diagram showing how fuel and air re supplied to the heater in one embodiment of the ıvention.

Looking now at FIG. 10 it will be seen that the preheated combustion air supplied through line 278 is divided into two lines 282 and 284. Line 282 provides combustion air for a pilot light 252, through a manual valve 286. The pilot light may receive fuel from, for example, a source 288 for bottled propane gas. Conventional pressure controls and ignition equipment may be provided for this purpose.

The line 282 also supplies air to the liquid fuel atomizer 258.

The air supply line 284 supplies the bulk of the combustion air through the combustion air inlet 256, and this line also includes the main temperature control valve 290. In the preferred embodiment of the invention this valve may be a butterfly valve or the like which is motor operated from the main control panel to provide the desired outlet temperature for the crude oil being heated in the heater. Thus, the setting of the butterfly valve controls the amount of combustion air going to the heater. In addition, the pressure of the combustion air downstream of this valve is applied through control lines 292, 294 and 296 to diaphragm operated valves 298 and 300.

Valve 298 controls the flow of gas from line 158 into the burner 254, a manual control valve 302 also being provided in this line. The valve 300 controls the flow of liquid fuel through a pipe 304 to the liquid fuel atomizer 258, the pipe 304 also containing a manually controlled valve 306. Thus the setting of the temperature control valve 290 also serves to provide a setting for the diaphragm operated valves 298 and 300, thereby controlling the flow of fuel to the burner. These valves are coordinated so as to maintain a proper fuel-air ratio at different heating requirement conditions.

Alternatively, a crude oil temperature sensing device may be the source of control of flow of fuel and air, or other types of controls well known in the art may be used.

It will be appreciated that in the embodiment shown the heater may operate on gas alone, liquid fuel alone, or a combination of both, depending upon availability of fuels. Normally it would be preferred to use all of the gas produced in the process, and supplement this with liquid fuel when necessary.

The liquid fuel may be supplied through the lines 236 and 238 as previously described. In the embodiment shown in FIG. 10 the line 236 connects to a three-way valve 308 which is also connected by a line 310 to the diesel oil line 238. Thus the valve 308 can be operated to conduct either residue fuel oil or diesel oil through a line 312, a solenoid valve 314, an outlet line 316 from the solenoid valve and into line 304 leading to the burner.

The line 238 may also be connected through a valve 318 and lines 320 and 322 to a fuel storage tank 324. The valve 318 is controlled by a level controller 326, so that diesel oil is admitted to the storage tank when the level of fuel in the tank drops below a desired level. The storage tank is desirably maintained with about one day's supply of fuel for the engine and several hours supply for the heater in order to insure that adequate fuel is available for start up and in the event of emergencies.

The outlet from the storage tank is through a line 328 which has a branch 330 to the diesel engine 40. Fuel from the storage tank for the heater is provided through a fuel pump 332 driven by an electric motor 334. The output from the pump passes into line 304, which contains a check valve 336 intermediate the pump and the connection with line 316.

Downstream of the line 316 another line 338 leads to a solenoid valve 340. The line 338 contains a pressure control valve 342. Line 304 also has a pressure control valve 334 which is positioned between the connection of line 338 and the valve 300. Line 338 leads to a three-way solenoid valve 340 which has an outlet line 342 connected into a threeway valve 344A, the other outlet being connected to line 322. Valve 344A is connected to lines 240 and 242 for return of residue fuel oil and diesel oil to product storage as shown in FIG. 2. Through line 322, excess diesel fuel is returned to the storage tank 324, a check valve 345 in this line preventing reverse flow.

A mechanical linkage indicated by the broken line 346 connects the valves 308 and 344A so that these valves are operated together. These are connected in such a way that when diesel oil is being supplied from line 238, excess diesel oil is returned through line 242; and when residue oil is being supplied through line 236, excess residue oil is returned through line 240. This insures that there will be no mixture of the diesel and the residue.

The solenoid valves 314 and 340 are operated by control lines 348 and 350 connected in the power circuit of the pump motor 334. These solenoid controls are connected so that when the pump is running any excess diesel oil is automatically returned to the fuel storage tank 324 and there is no mixture of the diesel oil with residue oil. Thus when the pump is running valve 314 closed and valve 340 is operated to cause flow from line 338 to line 322. This insures that diesel oil will not be returned to the main plant system when the pressure control valves 342 and 344 cause diesel oil to be bypassed.

Preferably, if there is insufficient gas to operate the heater, the residual fuel oil is used for heating purposes. Under that condition the pump 332 will not be operating, since no diesel oil from the fuel storage tank 324 will be required. Thus the solenoid valve 314 will be open and the three-way solenoid valve 340 will be turned so as to pass excess fuel through line 342. The valves 308 and 344A are then turned to such a position that residual fuel oil will be supplied through the line 236, valve 314 and line 316, and excess residual fuel oil will be returned through valve 340, valve 344A and residual fuel oil line 240. Such excess residual fuel oil will be returned in this manner when the pressure control valves 342 and 344 cause flow to the heater to be less than that supplied for heating purposes. The system should be designed so that sufficient fuel oil can be supplied to provide the total fuel requirements of the heater. Then when some gas is available for heater fuel, the temperature-controlled valve 300 will be partially closed, thereby increasing the pressure in flow line 304 so as to actuate the pressure control valves 342 and 344 to bypass fuel oil back to product. The system works in the same way to bypass excess diesel oil when diesel oil is being used for heater fuel.

Skid Details

For a better understanding of the skid construction of this invention and of a preferred way of mounting the fractionation tower 130 reference is now made to FIGS. 3 to 8 of the drawing. In FIG. 3 the skid is shown with only the tower 130 installed, the tower being shown in operating position and the remainder of the equipment mounted on the skid being omitted for better understanding of the skid structure.

As there shown, the elongate beams 16 and 18 are connected by the cross members 20 and 22, and by intermediate cross members 402, 404, 406, 408, 410 and 412. The cross members are connected together by means of intermediate longitudinally extending beams such as the beams 414 and 416. Diagonal beams such as the beams 418 and 420 serve to provide further bracing of the base portion of the skid.

In the embodiment shown in the drawing, four bridge trusses, one of which is indicated generally at 24, are shown. Truss 24 is typical of these, including a longitudinally extending top tension member 417 rigidly fastened to three vertical posts 419, 421 and 422. Slanted end tension members 424 and 426 extend from the ends of the top member 416 to one end of base beam 18 and to near the opposite end of the base beam 18, thereby providing support for the ends of the beams. Intermediate diagonal support members 428 and 430 connect to the upper ends of posts 419 and 422 respectively and to the lower end of post 421.

Each of the trusses mounted on the beams 16, 18, 414 and 416 are similarly constructed, so that each beam with its associated truss forms a unitary bridge truss able to carry a load substantially greater than the load which the base beams alone would carry. Thus, in one unit it was possible to use 12 inch wide flange base beams together with relatively small structural members in the trusses and achieve a strength equivalent to that which would be provided by a 36 inch wide flange beam without the truss structure. This allows the overall height of the unit to be reduced by a substantial amount, in this case 24 inches, without sacrificing strength. Since the unit of this invention is designed for carrying on the highway, height limitations are a major factor in the design.

The elements of the trusses may be made of any suitable structural materials, steel pipe being one such material. Alternatively, I-beams, channels, angles or the like may be used.

Those structural elements just described are desirably welded together or otherwise rigidly connected together. The structure shown in FIG. 3, however, has cross members connected between the trusses, some of which cross members are preferably removable so that equipment can be installed on the base members of the skid, between the truss members, or removed from such installation location. For example, the heat exchangers 112, 122 and 124, as shown in FIG. 1, rest upon the cross members 28, 30 and 32. It will be appreciated that in order to be able to install and remove these heat exchangers cross elements 432, 434 and 436 must be removable. Such removability is readily accomplished by bolting these elements in place. Conveniently, the elements may be made of pipe with flanges on the end which are bolted to adjacent structural elements.

Tower Mounting

In the embodiment of the invention shown in FIG. 3 the tower 130 is pivotally mounted on a pair of posts 50. In operating position the lower end of the tower is secured in place by means of an adjusting mechanism indicated generally at 443. As previously described, in transport position the tower rests upon the post 52. As seen in FIG. 5, this post is braced by a pair of guy wires 440 which are made adjustable by means of turnbuckles 442.

As shown in FIG. 4, the pipes 444, 446, 448 and 450 connected to the tower 130 have removable elbows 452, 454, 456 and 458, respectively, connected thereto. Before pivoting the tower from operating position to transport position these elbows are removed. The tower can then be pivoted free of interference from connecting pipes.

The pivot mounting of the tower is shown more clearly in FIG. 6. As there shown, a shaft 460 on the tower is carried in a journal 462 which rests upon a flange 464 mounted on the post 50. Apparatus for leveling the tower includes a jack screw 466 provided for raising and lowering the journal. When the jack screw 466 is used to elevate the journal, shims are placed below the flange 466, then the bolts 468 are tightened down to secure the tower in position.

Further apparatus for leveling of the tower is provided by the adjustment mechanism 443 illustrated in detail in FIGS. 7 and 8. This mechanism includes a downwardly extending I-beam section 470 on the lower end of the tower 130 which clears the top of cross beam 408. The depending section 470 is provided with a pair of horizontally extending slots 472 which receive jack screws 474, the jack screws being mounted in a bracket 476 which is fastened to the cross beam 408. At 90° to the jack screws 474 a pair of jack screws 478 are positioned to bear against the opposed flanges of the section 470, these jack screws being mounted in brackets 480 which are rigidly fastened, as by welding, to the cross beam 408. Thus, by adjustment of the jack screws 474 and 478, in coordination with adjustment of the jack screw 466, the lower end of the tower may be moved as necessary to bring the tower to vertical position, as is required to level the trays in the tower. Once the level position is obtained the adjusting nuts on the jack screws 474 and 478, and the bolts 468, may be tightened to secure the tower in position.

The tower 130 is provided at its upper and lower ends respectively with eyes 131 and 133. The eye 131 is positioned to receive the bolt through the clevis 54 to hold the tower in transport position, and the eye 133 is provided for connecting a cable which is pulled in order to elevate the tower from transport position to operating position.

Miscellaneous

As is well known in the art, a topping unit such as that of the present invention is necessarily provided with control equipment for maintaining desired process conditions, sensing devices for detecting process conditions throughout the system and indicators for indicating such process conditions. Furthermore, an automatic shutdown system is installed to shut down the entire system in the event of a failure somewhere in the system which could endanger the plant or personnel, or could result in an unsatisfactory product. Such a system preferably includes a first out alarm annunciator which provides a signal to indicate where the initial failure occurred. All of such controls, sensors, indicators, and the like, and the application of them to a topping plant system, are well known in the art, and a detailed description of them herein would merely unduly lengthen and complicate the specification. Reference has been made already to certain sensing and control equipment where it was important to an understanding of the operation of the system. For example, the fuel supply lines to the heater have been described as being controlled by temperature controlled valves. The operator determines the temperature at which he wishes the heater to operate and sets the control equipment to obtain this temperature. Also, a temperature controller controls the flow of reflux gasoline to the tower. This controller can be set as desired by the operator. Other manually operated valves are provided to control the flow of diesel oil and residual fuel oil from the tower.

By suitable adjustment of each of these controls the operator is able to vary the quality of the product, and is also able to adjust operating conditions as may become necessary due to changes in the characteristics of the feed material. The provision of a flow control valve 110 controlling the rate of flow of crude into the unit adds to this capability.

As a result of such control capability the plant of this invention is able to operate with a wide variety of feed materials and to produce a variety of products, in accordance with demand. Furthermore, with some feed materials the plant will have a substantially greater capacity than with others, because of differing heating and cooling requirements. It has been determined that a plant which can be completely contained in a unit 12 feet wide, 45 feet lone, and 11 feet high can handle 750 to 1,500 barrels per day of crude oil, producing gasoline, No. 2 diesel oil, and residual fuel oil.

A major benefit of the topping plant of this invention when a diesel power unit is used is that it requires no outside utilities, since no water is required in the process, electricity is generated within the unit, and fuel for the diesel engine and for the heater are produced by the unit. A storage tank of start up fuel is carried within the unit. However, the invention also contemplates the use of an electric motor or other power unit where desired.

Because of the particular type of heater used, the maximum temperature anywhere in the unit may be as low as 900° F., which is substantially lower than has heretofore been possible in topping units. This greatly reduces the possibility of accidents and explosions due to high temperatures.

The jack stands 12 under the longitudinal beams of the skid are positioned in coordination with the bridge trusses so that the weight of the plant may be supported on four jack stands without any substantial deflection in the main longitudinal beams. Thus, the plant may be supported up off the ground on these jack stands. This is particularly advantageous for moving the plant from one location to another, since the plant may be jacked up, a low bed truck backed under the plant, and the plant then lowered down onto the truck bed. The cost of moving the plant from one location to another is therefore greatly reduced.

Although various embodiments and variations of the apparatus, system and method of this invention have been described herein, the invention is not limited to these alone but extends to all forms of the invention which may be included within the scope of the language of the accompanying claims.

I claim:

1. A portable crude oil distillation unit suitable for transporting on highways as a single unit comprising
   a crude oil heater,
   a fractionating tower connected to receive heated crude oil from said heater and to separate the crude oil into liquid and gaseous fractions,
   a power unit connected to provide power for said distillation unit,
   heat exchanger units connected to receive products from said fractionating tower, and
   an air cooler connected to receive said products for further cooling,
   all of which, together with supporting equipment, is mounted on a single skid, said skid comprising
   a plurality of elongate and cross beams forming a base frame and supporting bed,
   reinforcing structure connected to each of said elongate beams and extending upwardly therefrom intermediate elements of the distillation unit, thereby forming with said beams a plurality of unitary parallel trusses, and
   structural members intermediate elements of the distillation unit extending between and connecting the trusses and the beams together, said elongate beams having insufficient strength to bear the weight of the aforesaid heater, tower, power unit, heat exchanger units, air cooler and supporting equipment, and said trusses including said beams having sufficient strength to bear such weight.

2. A portable crude oil distillation unit as defined by claim 1 wherein said fractionating tower is pivotable between a horizontal transport position and a vertical operating position.

3. A portable crude oil distillation unit as defined by claim 2 and including
   means for selectively transferring liquid fractions to said power unit and liquid or gaseous fractions to said heater for fuel.

4. In a portable crude oil distillation unit which includes a factionating tower mounted on a transportable base, the improvement which comprises means pivotally mounting said tower on said base for movement between a substantially horizontal and a substantially vertical position, means on said base for securing said tower in each of said positions, and
   means engaging said base and said tower operable to adjustably position said tower when in said vertical position as required for leveling the trays within said tower.

5. In a portable crude oil distillation unit as defined by claim 4,
   piping connected to said tower to conduct crude oil to the tower and distillation products therefrom, and
   removable nipples in said piping, whereby the piping can be disconnected for movement of the tower between horizontal and vertical positions.

6. A self-contained portable crude oil distillation unit mounted on a single skid, comprising
   a crude oil heater,
   a fractionating tower connected to receive heated crude oil from the heater and adapted to distill crude oil into a plurality of fractions,
   a power unit connected to provide power for driving fluid pumping equipment and electrical power,
   heat exchanger units connected to use waste heat to preheat the crude oil feed to the heater,
   an air cooler connected to cool the distilled fractions as separate entities and
   means for feeding a part of a fraction deriving from the fractionating tower to fuel the power unit,
   whereby the entire unit can be operated on processed crude oil feed without the necessity for any external source of utilities.

7. A portable crude oil distillation unit as defined by claim 6, and including
   means for selectively feeding various fractions deriving from the fractionating tower to fuel the heater.

8. In a portable crude oil distillation unit including a fractionating tower and a crude oil heater connected to supply heated crude oil to said fractionating tower, a power unit comprising a diesel engine driving a blower and an electric generator, said blower being connected to provide combustion air for said crude oil heater, fuel for said heater comprising a liquid or gaseous fraction derived from said fractionating tower.

9. In a unit as defined by claim 8, a second blower driven by said diesel engine and connected to recirculate at least a portion of the products of combustion to said heater.

* * * * *

UNITED STATES PATENT AND TRADEMARK OFFICE
CERTIFICATE OF CORRECTION

PATENT NO. : 3,953,298

DATED : April 27, 1976

INVENTOR(S) : Jim Smith Hogan

It is certified that error appears in the above-identified patent and that said Letters Patent are hereby corrected as shown below:

Column 1, Line 33: After "for", delete "transporation" and insert -- transportation --.

Column 2, Line 66: After "and", delete "disadvantages" and insert -- advantages --.

Column 4, Line 7: After "also", insert -- belt --.

Column 9, Line 24: After "valve", delete "334" and insert -- 344 --.

Column 12, Line 8: After "a", delete "first out" and insert -- "first out" --.

Column 12, Line 42: After the second use of "feet", delete "lone" and insert -- long --.

Column 13, Line 50: After "a", delete "factionating" and insert -- fractionating --.

UNITED STATES PATENT AND TRADEMARK OFFICE
CERTIFICATE OF CORRECTION

PATENT NO. : 3,953,298
DATED : April 27, 1976
INVENTOR(S) : Jim Smith Hogan

It is certified that error appears in the above-identified patent and that said Letters Patent are hereby corrected as shown below:

Column 9, Line 26: After "line", delete "342" and insert -- 343 --.

Signed and Sealed this

Eleventh Day of July 1978

[SEAL]

Attest:

RUTH C. MASON
*Attesting Officer*

DONALD W. BANNER
*Commissioner of Patents and Trademarks*